(12) United States Patent
Leaney

(10) Patent No.: US 6,917,564 B2
(45) Date of Patent: Jul. 12, 2005

(54) METHOD OF PROCESSING SEISMIC DATA

(75) Inventor: Scott Walter Leaney, Cuckfield (GB)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/333,482

(22) PCT Filed: Jul. 26, 2001

(86) PCT No.: PCT/GB01/03363

§ 371 (c)(1),
(2), (4) Date: May 20, 2003

(87) PCT Pub. No.: WO02/10798

PCT Pub. Date: Feb. 7, 2002

(65) Prior Publication Data

US 2004/0008578 A1 Jan. 15, 2004

(30) Foreign Application Priority Data

Jul. 27, 2000 (GB) .............................................. 0018480

(51) Int. Cl.⁷ .............................. G01V 1/30; G01V 1/38
(52) U.S. Cl. ............................. 367/73; 367/57; 702/14; 702/18
(58) Field of Search .............................. 367/57, 73, 21; 702/6, 11, 13, 14, 18, 16

(56) References Cited

U.S. PATENT DOCUMENTS

| | | | | |
|---|---|---|---|---|
| 5,583,825 A | * | 12/1996 | Carrazzone et al. | 367/31 |
| 5,696,735 A | * | 12/1997 | Krebs | 367/50 |
| 5,742,560 A | * | 4/1998 | Krebs | 367/57 |
| 6,002,642 A | * | 12/1999 | Krebs | 367/73 |
| 6,128,580 A | * | 10/2000 | Thomsen | 702/18 |
| 6,131,071 A | * | 10/2000 | Partyka et al. | 702/16 |
| 6,263,284 B1 | * | 7/2001 | Crider et al. | 702/14 |
| 6,292,754 B1 | * | 9/2001 | Thomsen | 702/14 |
| 6,388,947 B1 | * | 5/2002 | Washbourne et al. | 367/73 |

OTHER PUBLICATIONS

Rowbotham, P. S., "Anisotropic migration of coincident VSP and cross–hole seismic reflection surveys," Geophysical Prospecting, vol. 45, No. 4, Jul. 1997, pp. 683–699.*

Rossi et al., "Joint 3D Inversion of Direct and Reflected Arrivals from Surface and SWD Seismic Data," 60th EAGE conf. (Leipzig, Germany Jun. 8, 1998), ISBN 90-73781-09-4.*

Simmons, Jr. et al., "Twin VSP Simulation of Crosswell Seismic Tomography," 67th Annual SEG meeting (Dallas, Nov. 1997) pp. 230–233, ISSN 10523812.*

Coulombe et al., "Elastic wave AVO using borehole Seismic data," 62nd Annual SEG meeting (New Orleans, Oct. 1992), pp. 864–866, ISSN 10523812.*

* cited by examiner

Primary Examiner—Ian J. Lobo
(74) Attorney, Agent, or Firm—WesternGeco, L.L.C.

(57) ABSTRACT

A method of processing seismic data, for example surface seismic data such as multi-component OBC (Ocean Bottom Cable) seismic data, comprises using vertical seismic profile (VSP) seismic data to determine a model of the relationship between depth within the earth and the velocity of seismic energy. In one embodiment, an model of the relationship between depth and velocity of seismic energy for P-waves is calibrated using VSP seismic data. Then, a model of the relationship between depth and velocity of seismic energy for S-waves is calibrated using VSP seismic data. Initially the models are calibrated for the vertical velocity of P-waves and S-waves, using zero-offset or low-offset VSP data. The models may then undergo further calibration steps, such as calibration for VTI anisotropy and anelastic attenuation. Once calibration is complete, the models are used to process surface seismic data.

21 Claims, 5 Drawing Sheets

FIG 2  The walkway-calibrated 160 layer VTI model.

METHOD OF PROCESSING SEISMIC DATA

The present invention relates to a method of processing seismic data such as surface seismic data, that is, seismic data acquired using one or more sensors disposed on the earth's surface. The sensor(s) may be disposed on land, on the sea-bed, or in the land/sea transition zone. The invention may also be applied to processing seismic data acquired using a towed sensor array.

One type of surface seismic data is seismic data acquired using an Ocean Bottom Cable (OBC) seismic surveying method. In an OBC seismic survey, a plurality of seismic sensors are attached to a support cable at intervals along the length of the cable. The cable is then lowered onto the sea-bed to deploy the sensors at their desired locations on the sea-bed. OBC seismic sensors generally record the pressure and the elastic wavefield of the seismic data. The pressure is a scalar quantity, whereas the elastic wavefield is a vector quantity and it is therefore necessary to measure the components of the elastic wavefield in three non-coplanar directions, usually in the x-direction, the y-direction, and the z-direction (vertical). In total, therefore, four components of the seismic data are measured. Multi-component seismic data recording at the sea-floor has proven to be a very successful method for imaging through gas saturated overburdens and for characterising hydrocarbon reservoirs.

Another seismic surveying arrangement is a towed marine seismic surveying arrangement. Such a surveying arrangement uses a seismic sensor, or an array of seismic sensors, that is disposed a few tens of metres below the sea surface and that is moved through the water by a towing vessel. The seismic sensor, or the array, is normally suspended from a float connected to the towing vessel. A towed marine seismic surveying arrangement further includes one or more seismic sources disposed below the sea surface, normally suspended from the towing vessel.

One problem encountered in the processing of surface seismic data such as OBC seismic data is that of mode-converted reflections. A mode-converted reflection is a reflection in which, for example, a down-going pressure wave (P-wave) is converted on reflection to an up-going shear wave (S-wave). Data obtained from a reflection in which a down-going pressure wave (P-wave) is converted on reflection to an up-going shear wave are known as P-s data, whereas data obtained from a reflection in which a down-going pressure wave is not mode-converted on reflection are known as P-p data. The existence of mode-converted reflections (also knows as mode converted events) makes it necessary to determine a separate depth-velocity relationship, or velocity field, for S-waves, in addition to determining a velocity field for P-waves. Other problems that arise as a result of mode-conversion reflections include asymmetric paths of seismic energy, stronger anisotropy effects, and increased attenuation of seismic energy.

The problem of determining anisotropic velocity fields is of particular importance. The anisotropic velocity field used to process the seismic data will affect the moveout correction of the data (that is, correcting the data for the horizontal distance—known as "offset"—between the source of seismic energy and the receiver). The anisotropic velocity field used to process the seismic data will also affect the shift from midpoint of the common conversion point (CCP).

One prior art approach is to model the velocity field of P-waves and the velocity field of S-waves using effective velocity models. In an effective velocity model, variations in the propagation velocity of seismic energy that occur within the earth's interior are modelled by an effective velocity of propagation of seismic energy. One well-known effective velocity model assumes that the medium through which the seismic energy travels is isotropic and that the velocity of seismic energy propagating within the medium is constant; this is known as the "hyperbolic assumption". Other effective velocity models contain non-hyperbolic terms, in an attempt to take account of the anisotropy of the earth.

Even after determining anisotropic effective velocity models for P-waves and S-waves, and using these models to moveout correct and stack the P-p and P-s seismic data, there remains the problem of correlating geological events in one set of data with geological events in the other set of data. This correlation is required to obtain the ratio Vp/Vs, the ratio of the vertical velocity of P-waves to the vertical velocity of S-waves, which is required for the CCP binning. In turn, the results of the CCP binning affect the P-s velocity analysis, so that prior art processing methods require an iterative technique in which the results of the CCP binning obtained using an initial velocity analysis are used to refine the velocity model, re-calculate the ratio Vp/Vs, and repeat the CCP binning. This procedure is time-consuming, and is also highly dependent on the correct interpretation of the P-p and P-s data sets in the correlation process.

A further problem with the prior art method is that in some cases reliable velocity fields cannot be determined. This can occur in gas clouds, for example, or if there is severe contamination of the seismic data by multiple reflections. Moreover, even if reliable effective, anisotropic velocity fields can be determined for both P-waves and S-waves from towed marine seismic data or surface seismic data such as OBC seismic data, it is not possible to determine a single, consistent anisotropic effective velocity model from surface data or towed marine seismic data alone.

A further problem associated with processing surface seismic data or towed marine seismic data is that mode conversion is not limited to occurring upon reflection. Mode conversion may also occur when, for example, a down-going wave passes from one layer of the earth's interior to another layer having different properties, and in particular when a down-going wave passes into a layer in which the velocity of seismic energy is high. Thus a down-going P-wave may be mode-converted to a down-going S-wave at a layer boundary within the earth rather than on reflection. A down-going P-wave that is mode-converted to a down-going S-wave and is subsequently reflected to give an up-going S(?)-wave is referred to as a P-S-s mode or P-S-s event. The presence of P-S-s modes complicates the interpretation of seismic data relating to a target reflector that is disposed below a high velocity layer.

One prior art approach to imaging a target reflector beneath a high velocity layer has considered coupling between P-waves and S-waves in the high velocity layer and pure P-wave propagation below the high velocity layer— see, for example, G. W. Purnell, "Geophysics", Vol 57, No 11 (1992), pp 1444–1452. An alternative approach has considered a P-s reflection in which a down-going P-wave is mode-converted to an up-going S-wave on reflection—see, for example R. R. Kendall et al in Expanded Abstracts of $68^{th}$ Annual International Meeting of Society of Exploration Geophysicists (1998), pp 2052–2055. However, there is currently no satisfactory approach for dealing with P-S-s mode converted events.

A first aspect of the present invention provides a method of processing surface seismic data or towed marine seismic data, the method comprising the step of using vertical seismic profile (VSP) seismic data to determine a model of the velocity of seismic energy. A second aspect of the invention provides a method of processing surface seismic data, the method comprising the step of using vertical seismic profile (VSP) seismic data to determine a model of the velocity of seismic energy. The invention enables a more accurate model of the relationship between the depth and the velocity of seismic energy to be determined.

In a preferred embodiment, the method comprises the step of calibrating a velocity model for the surface seismic data using VSP seismic data.

In this embodiment an initial velocity model is calibrated using VSP seismic data. The initial velocity model may be derived, for example, from seismic data for a dipole sonic log. Calibrating the initial velocity model using VSP seismic data enables an accurate velocity model to be produced at the start of the analysis process. This shortens, or even eliminates, the iterative process described above. Moreover, the invention also allows a reliable velocity model to be determined even if the surface seismic data are contaminated by multiple reflections or by gas clouds.

In a preferred embodiment, the method comprises the further step of calibrating the velocity model using surface seismic data. This further calibration step may be used, for example, to provide increased accuracy of the velocity model at depths above the shallowest VSP sensor. Alternatively, towed marine seismic data may be used in this calibration step.

In a preferred embodiment, a first velocity model for P-waves and a second velocity model for S-waves are determined using the VSP seismic data. Thus, the present invention enables accurate processing of seismic data which contains mode conversion events.

A further embodiment of the invention comprises the step of processing the seismic data using the or each velocity model determined using the VSP seismic data.

The invention may be applied to OBC seismic data. However, it is not limited to application to OBC seismic data, but may be applied to all surface seismic data or to towed marine seismic data. It may be applied to multi-component seismic data or to single component seismic data.

Other preferred features of the present invention are set out in the dependent claims.

Preferred embodiments of the present invention will now be described by way of illustrative example with reference to the accompanying Figures in which.

Figure 1:
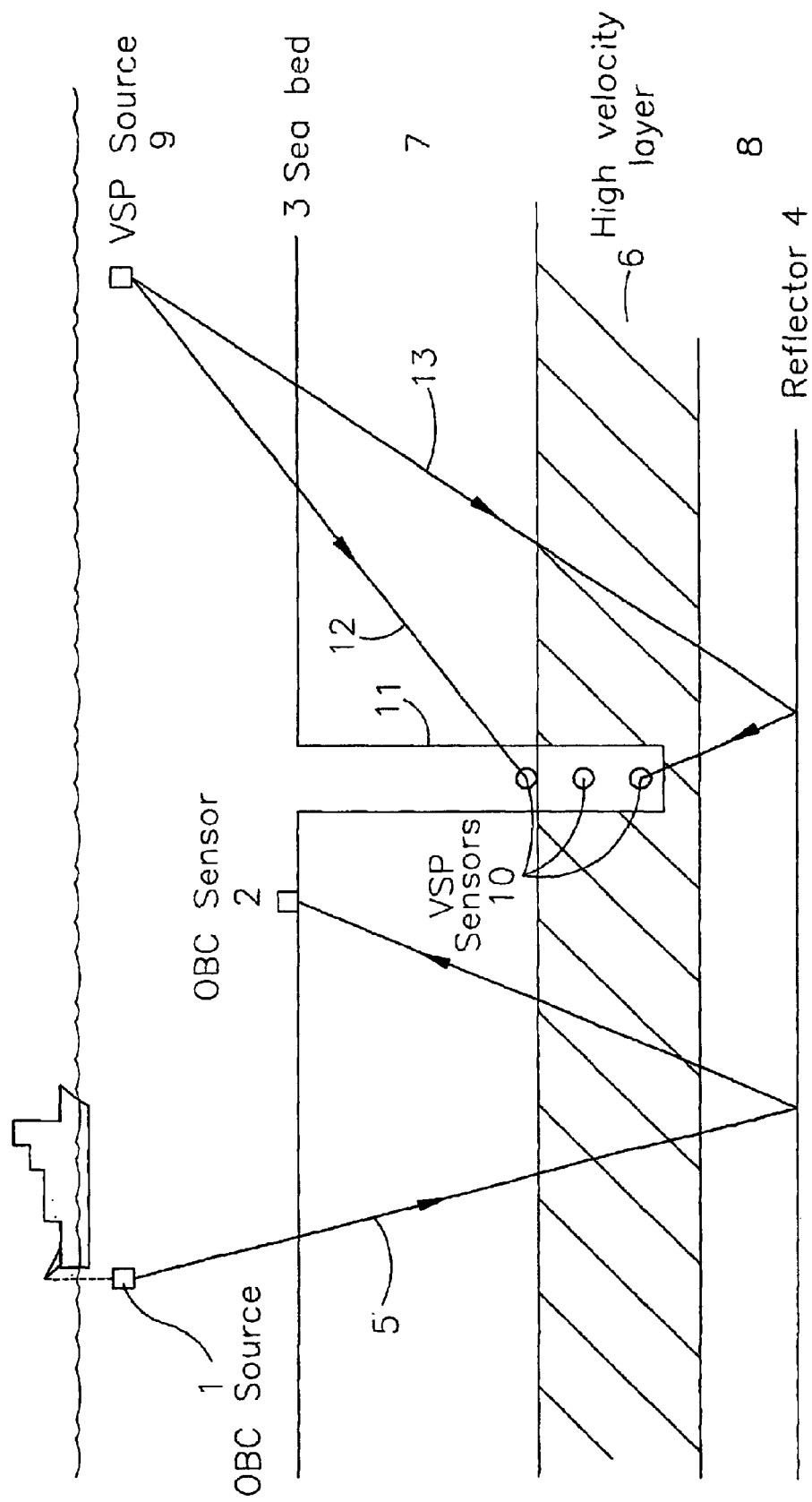
FIG. 1 is a schematic illustration of a seismic survey.

FIG. 1 is a schematic view of an OBC seismic surveying arrangement. The arrangement has a seismic source 1 and a seismic sensor 2 (otherwise known as a receiver) which together form a surface seismic survey. In the embodiment shown in FIG. 1 the seismic sensor 2 is a multi-component OBC sensor that forms part of an OBC sensor array, and is disposed on the sea-bed 3. Other sensors in the OBC sensor array, and the support cable for the OBC sensors, are omitted from FIG. 1 for clarity. As noted above, however, the invention is not, however, limited to processing data acquired in an OBC seismic survey.

The seismic source 1 and the OBC sensor 2 are being used to obtain data about a target reflector 4 disposed below the sea-bed. The path of the primary reflection of seismic energy from the seismic source 1 to the OBC sensor 2 via the reflector 4 is indicated in FIG. 1 as the path 5.

The geological structure of the earth above the target reflector 4 of FIG. 1 is not uniform. The earth's interior between the sea-bed 3 and the target reflector 4 includes an layer 6 in which the velocity of seismic energy is significantly greater than in the layer 7 below the high velocity layer 6 or in the layer 8 below the high velocity layer 6 (only three layers 6,7,8 are shown between the sea-bed and the target reflector 4 in FIG. 1, but in practice there will be many different geological layers between the sea-bed and the target reflector 4). The high velocity layer 6 might be, for example, a chalk layer, possibly a weathered chalk layer. One effect of the high velocity layer 6 is that down-going seismic energy undergoes mode conversion at the upper surface of the high-velocity layer 6. A down-going P-wave undergoes mode conversion to a down-going S-wave at the upper surface of the high-velocity layer 6, and is then reflected at the target reflector to produce an up-going S-wave. (In practice some reflection and refraction will occur at the layer boundaries, and seismic energy paths which involve multiple reflections may well exist. Reflections and refraction at the layer boundaries have been omitted from FIG. 1.)

As explained above conventional methods of processing the surface seismic data acquired by the sensor 2 would require a time-consuming iterative technique, even in the absence of mode conversion at the upper surface of the high-velocity layer 6. For the geological structure shown in FIG. 1, the processing of seismic data relating to the target reflector 4 will be complicated by the P-S-s mode conversions that arise due to the high velocity layer 6.

According to the processing method of the present invention, data from a vertical seismic profile (VSP) seismic survey is used in processing the data obtained by the surface sensor 2. More specifically, in an embodiment of the invention VSP data is used to determine a model of the relationship between depth and the velocity of seismic energy, and this velocity model is then used in the processing of the seismic data acquired by the sensor 2.

The surveying arrangement for obtaining VSP seismic data is also shown in FIG. 1. The VSP surveying arrangement consists essentially of a seismic source 9 disposed just under the surface of the sea (generally suspended from a survey vessel) and seismic sensors 10 disposed at different depths within a borehole 11. Seismic energy emitted by the VSP seismic source 9 may travel to one of the sensors 10 either by a direct path through the overburden (indicated as path 12 in FIG. 1) or via a reflection at the target reflector 4 (as indicated by path 13 in FIG. 1). By "overburden" is meant the part of the earth's interior that extends from the sea-bed 3 down to the depth of the shallowest of the VSP seismic sensors 10. The effects of refraction and reflection at the interface 8 have been omitted from paths 12 and 13.

Three seismic sensors 10 are shown in the borehole 11 of FIG. 1, disposed at three different depths, but the invention is not limited to this VSP survey arrangement.

FIG. 1 shows an offset VSP seismic survey in which there is a fixed, non-zero offset between the source 9 and the sensors 10, but it is also possible to carry out a VSP survey with an offset of approximately zero. It is also possible to carry out a VSP survey at two or more different offsets; a VSP survey in which data is available for more than one value of offset is generally known as a "walkaway" VSP seismic survey.

The general term "VSP seismic data" as used herein is intended to include zero-offset VSP data, fixed offset VSP data and multi-offset (walkaway) VSP data.

The initial step in the processing method of the present invention is to develop an initial model of the relation between depth and the velocity of seismic energy for P-waves. This is done, in this embodiment, by extending data from a dipole sonic log through the overburden. This can be done using one or more of a compaction trend velocity, regional check-shot information, or surface seismic Dix velocities. Once the extended model for the velocity of P-waves has been established it is then calibrated using a standard process of sonic calibration (that is, using direct VSP arrival times obtained from zero-offset or low-offset VSP seismic data).

Once a satisfactory model for the velocity of seismic energy has been developed for P-waves, the next step is to determine a model for the velocity of seismic energy for S-waves. The initial velocity model used for S-waves is obtained from the shear sonic, and this is calibrated using S-wave velocities picked from the horizontal components of zero-offset VSP data or offset VSP data.

It has been found that in the case of a vertical borehole there is little difference between the S-wave depth-velocity relationship derived from a dipole sonic log and the S-wave depth-velocity relationship derived from VSP seismic data. This is not the case, however, for a borehole that is deviated from the vertical. For a borehole that is deviated from the vertical, polar anisotropy can cause the S-wave velocity derived from a dipole sonic log to be significantly higher than the true S-wave velocity. In this case, the value for the S-wave velocity derived from the VSP data is used instead of the S-wave velocity derived from the dipole sonic log.

No reliable direct measurement of the S-wave velocity for depths above the shallowest VSP sensor 10 is available, since it is not always possible to identify a mode conversion from P-waves to S-waves at the sea-bed from VSP data. The S-wave velocity for depths above the shallowest VSP sensor 10 may be estimated from the P-wave velocity measured for the overburden, using a known or estimated relationship between the P-wave velocity and the S-wave velocity. In a preferred embodiment, however, the relationship between depth and S-wave velocity for depths above the shallowest VSP sensor 10 is determined using an extrapolated compaction trend in Vp/Vs. The compaction trend in Vp/Vs is constrained to pass through a predetermined value at the sea-bed 3, and varying the value of Vp/Vs provides a method calibrating the vertical S-wave velocity for depths above the shallowest VSP sensor 10. This calibration uses the near offset moveout of shallow P-s mode conversion reflections in OBC radial data; ray-based moveout correction is used to remove the near offset reflection moveout by varying the Vp/Vs ratio and thus varying the S-wave velocity in the overburden. This quickly leads to a model for the S-wave velocity in the overburden.

The resulting model for the vertical S-wave velocity is preferably then compared with P-s mode converted events in offset VSP data, and adjusted if necessary.

Preferably, the method includes a further calibration step of the S-wave velocity for depths above the shallowest VSP sensor 10. In this further calibration step, shallow marker events on the corrected OBC common receiver gather are compared with VSP data for P-s mode converted reflections, or with simulated data for P-s mode converted reflections. The model for the S-wave velocity for the overburden is further adjusted, if necessary, to improve the results of this comparison. In order to carry out this step by comparing the OBC data with simulated data for P-s mode converted reflections a density model of the geological structure in the area of the seismic survey is required, and this can be developed from the edited density log and from a calibrated Gardner's relationship (a calibrated empirical relationship between the P-wave velocity and the density) for the overburden.

Thus, the present invention makes it possible to develop a velocity model for S-waves, by using VSP data and surface seismic data (in this embodiment OBC seismic data) to calibrate an initial model developed from borehole seismic data. The velocity model can then be used to process the surface seismic data.

In a further embodiment of the present invention, the velocity model is further refined to take account of polar anisotropy. It is possible to determine polar anisotropy by minimising the residual long-offset moveout of P-p and P-s reflections on OBC data. Alternatively, if data from a walkaway VSP seismic survey is available then polar anisotropy may be determined by using the arrival times of the direct seismic pulses recorded in the walkaway VSP seismic survey.

The step of calibrating the velocity model for polar anisotropy using walkaway VSP data is carried out using a simple two parameter time inversion. The ellipticity parameter and the anellipticity parameter are each assumed to vary linearly with depth from a value of zero at the sea-bed. The ellipticity and anellipticity parameters are varied, and the values that minimise the difference between the modelled direct arrival time and the measured direct arrival time of P-waves are selected.

The above description has treated the overburden as a single layer. The overburden will, however, generally consist of more than layer, and the layers that extend throughout the well depth are each calibrated using VSP seismic data (sonic calibration). Each layer that extends through the well depth is also preferably calibrated for anisotropy using moveout times, using a piecewise gradient assumption, to obtain the intrinsic VTI parameters for the layer.

It is preferably assumed that a layer is isotropic if the Vp/Vs ratio for that layer is below a threshold value. This enables accurate modelling of a layer that is isotropic, or only weakly anisotropic, for example such as a reservoir sand layer.

The direct travel times are preferably corrected for dip, for example using the method proposed by C. M. Sayers in "Geophysics" Vol 62, No 3 (1997), pp 723–729.

The layered VTI model developed according to the above-described method of the invention is valid for converted Sv modes because, provided that the vertical velocities of P-waves and S-waves have been correctly determined, long offset moveout is sufficient to estimate the VTI parameters governing the propagation of Sv modes. If VSP walkaway data is available for receivers at more than one depth, a piecewise gradient model in anisotropy parameters can be determined.

In a further embodiment of the invention, the velocity model is further calibrated to take account of anelastic attenuation, generally know as Q (a dimensionless parameter). This calibration can be done by inverting direct arrival waveforms obtained using zero-offset VSP and/or walkaway VSP, for example using the coherency Q inversion method described by W. S. Leaney in "Walkaway Q Inversion" in Expanded Abstracts of 69th Annual International Meeting of Society of Exploration Geophysicists (1999), pp 6–52.

In one study it was found that a single Q value, of 54, provided good compensation of VSP waveforms at all depths, although the chalk interval indicated a slightly lower Q value for the chalk layer than for other layers. If offset VSP data are available with sufficient offset to generate significant mode conversions, then a reliable estimate of Q for S-waves, $Q_{shear}$, is also possible over the depth interval of the VSP data.

Figure 2:
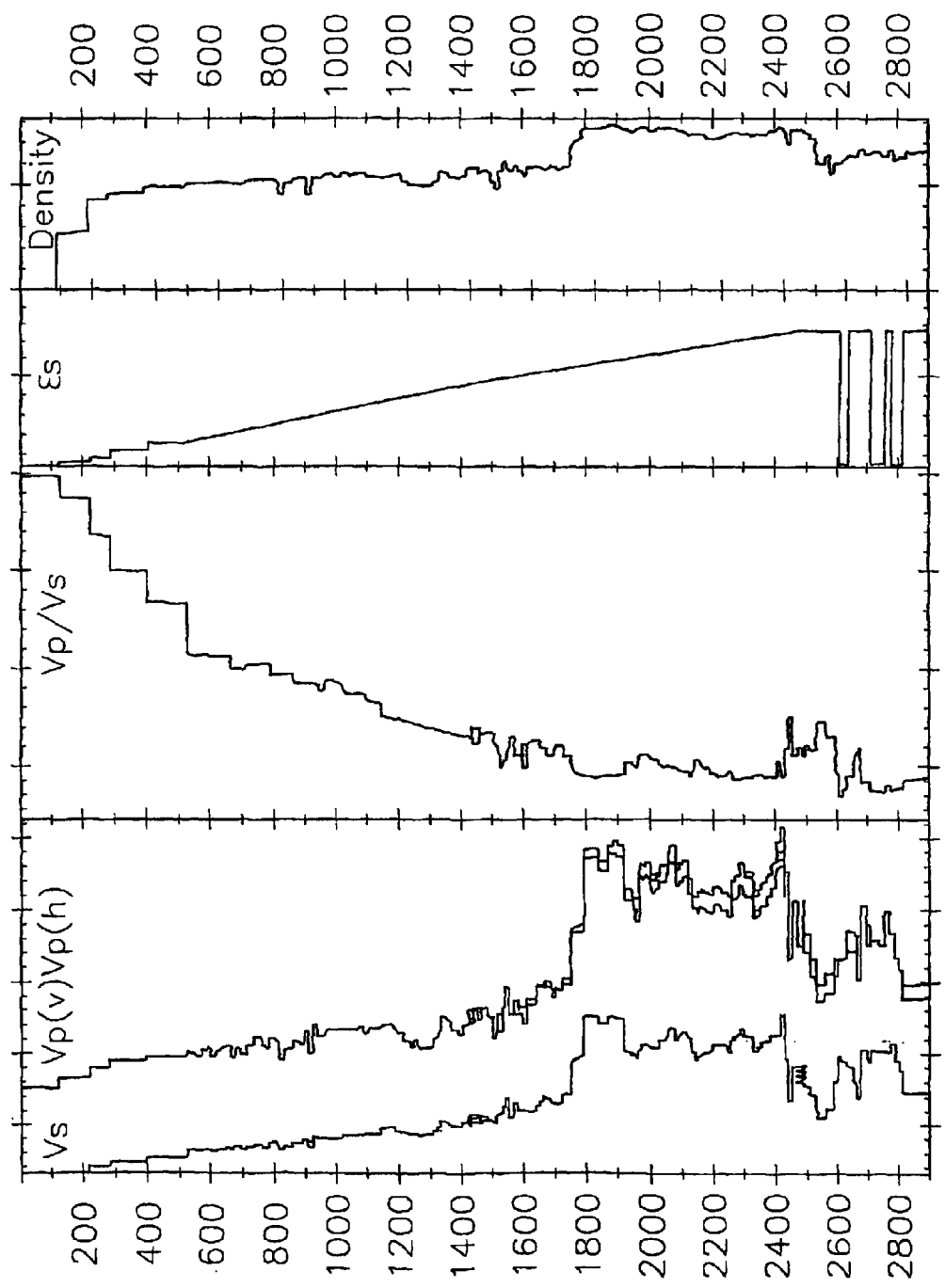
FIG. 2 is a schematic illustration of a velocity-depth model obtained using a method of the present invention.

FIG. 2 illustrates an anisotropic velocity model obtained by a method of the present invention. This model has 160 layers, and extends to a depth of 2,900 metres. Starting from the left, FIG. 1 illustrates the vertical velocity of S-waves, Vs; the ratio between the vertical velocity of P-waves and the horizontal velocity of P-waves Vp(v)/Vp(h); the ratio of the vertical velocity of P-waves to the vertical velocity of S-waves, Vp/Vs; Schoenberg's anisotropy parameter, $\epsilon_s$; and the density. The model uses a constant Q value of 54 for both P-waves and S-waves.

The 160 layer model shown in FIG. 2 was used to simulate data, although a simpler model having only 25 layers was used in processing to compensate for Q and geometric spreading, for normal moveout (NMO) correction, for CCP binning and for angle band mute design.

The approach described above based on a VTI velocity model produced good results in processing P-s mode conversion events. The model may also be used to process P-S-s mode conversion events. Simulations using the model of FIG. 2 showed that the most efficient mode conversion from a down-going P-wave to a down-going S-wave occurred at the upper surface of a high velocity layer (such as a chalk layer). This conversion mode is advantageous, since the lower velocity once the mode conversion has occurred should lead to better vertical resolution and to less contamination of the data by multiple reflections.

Figure 3:
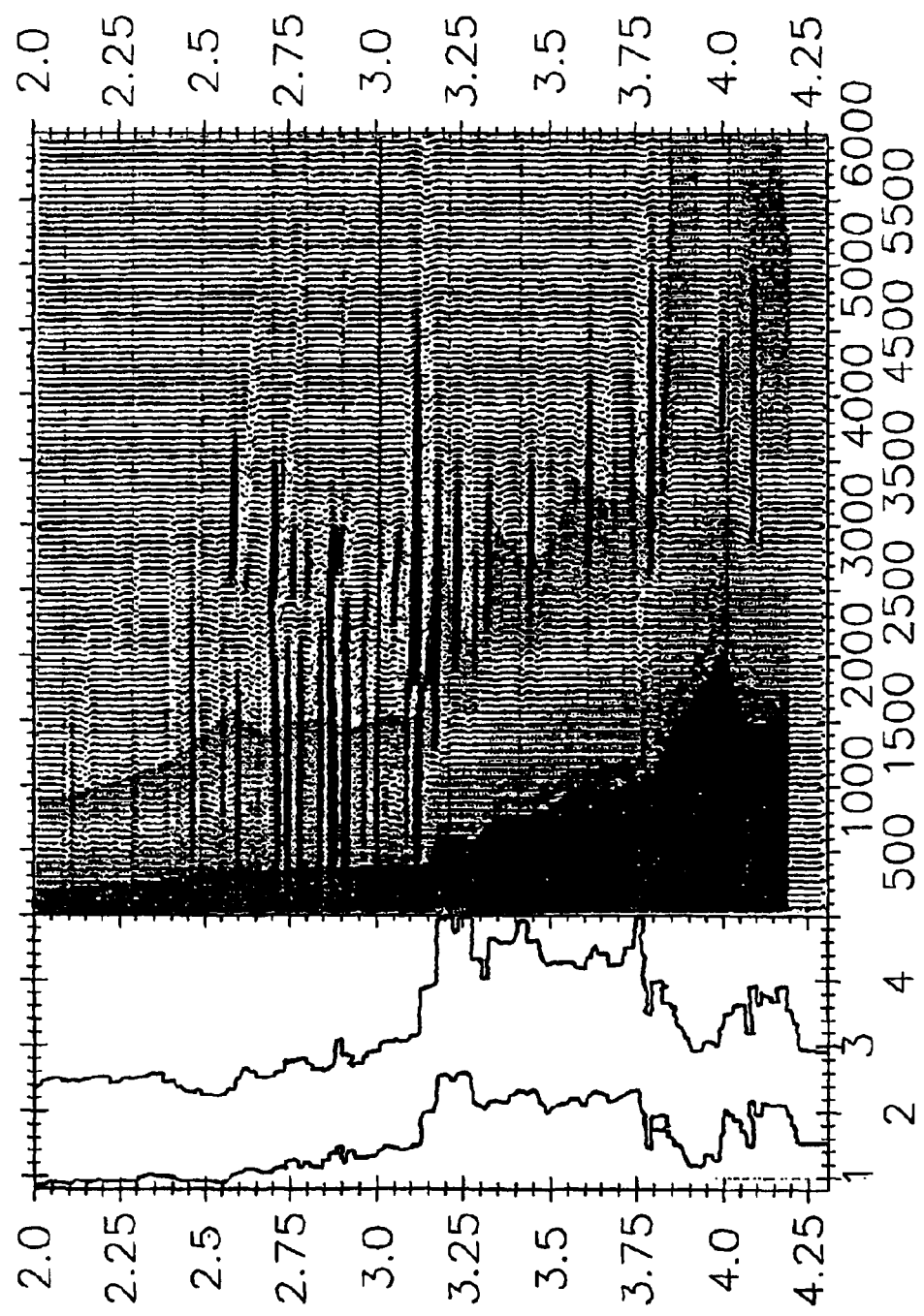
FIG. 3 shows data traces simulated using the model of FIG. 2.

FIG. 3 shows data traces simulated using the model of FIG. 2. FIG. 3 shows, from the left, the vertical velocity of S-waves, the vertical velocity of P-waves, and the simulated seismic traces (showing only primary reflections). The y-axis of FIG. 3 represents two-way travel time (in seconds). The x-axis is in metres/second for the velocity of S-waves and P-waves, and in metres for the simulated seismic traces. A high velocity chalk layer exists, with the upper surface of the high velocity layer corresponding to a travel time of 3.12 s. Above the upper surface of the chalk layer the events are P-s reflections, and below the upper surface of the chalk layer the events are P-S-s reflections. The data was simulated using a 10–45° angle band for P-s stacking and a 20° inner mute for P-S-s stacking to avoid the polarity reversal that occurs on reflection of a down-going S-wave.

Figure 4:
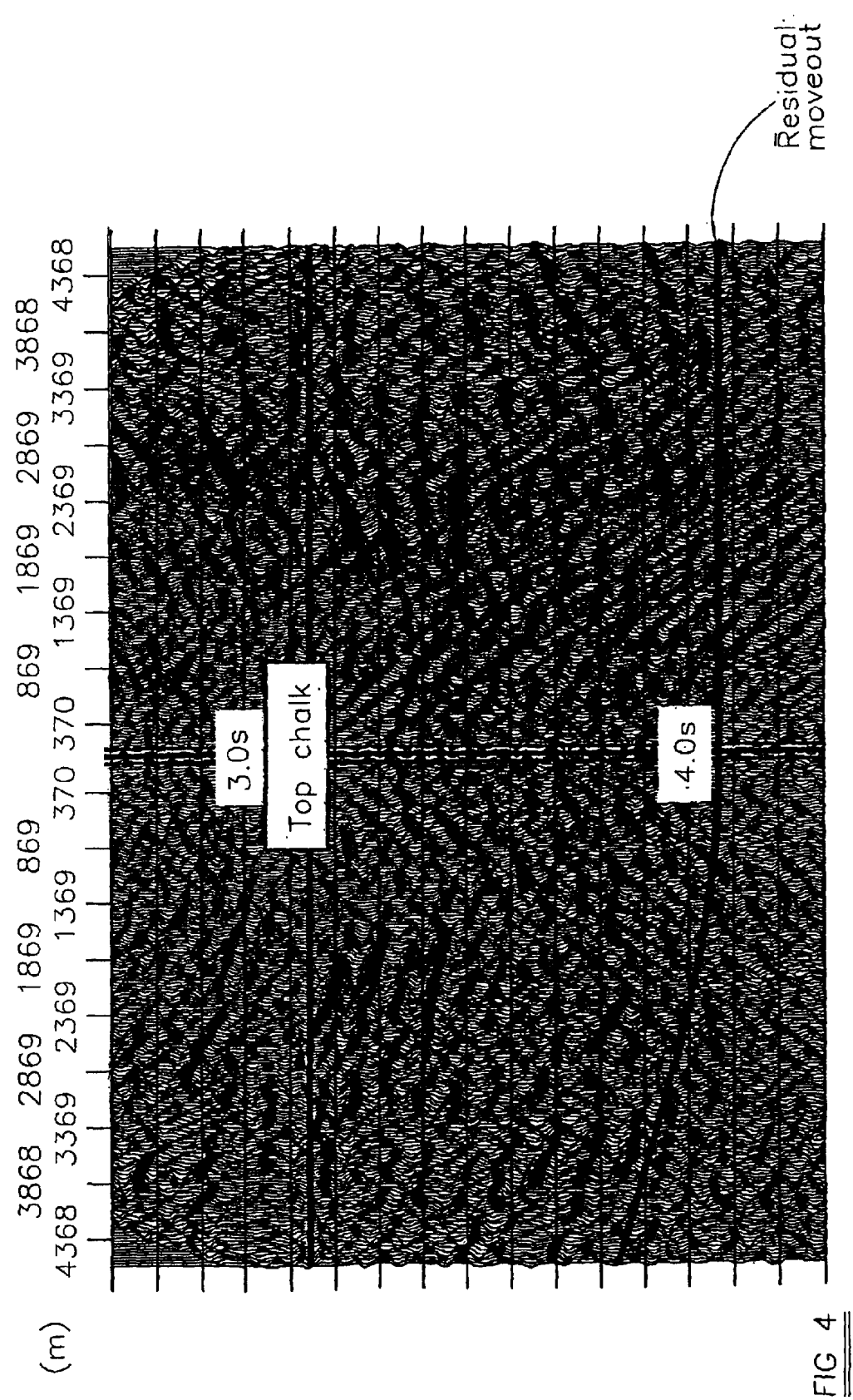
FIG. 4 shows a comparison between the results obtained by processing seismic data using an isotropic velocity-depth model and the results obtained using a velocity-depth model of the present invention.

FIG. 4 illustrates the effect of anisotropy on P-S-s reflection events occurring below a high velocity layer. The x-axis represents horizontal distance (in metres), with the borehole located at x=0. The y-axis represents P-s two-way times (in seconds). A high velocity chalk layer exists, with the upper surface of the chalk layer corresponding to a travel time of 3.12 seconds.

On the left of the borehole the Figure shows the results of moveout correcting P-S-s events using an isotropic model, and on the right of the borehole the Figure shows the results of moveout correcting P-S-s events using an borehole-calibrated VTI model of the present invention. The borehole-calibrated VTI model of the invention incorporates geometric spreading, and also has Q compensation (using a Q value of Q=54 for both S-waves and P-waves). The residual moveout, relative to the borehole-calibrated VTI model of the present invention is indicated on the Figure, and it will be seen that the residual moveout for the isotropic model increases strongly with increasing offset.

Once the surface seismic data has been moveout corrected using a velocity model of the present invention, common reflection point binnning (CRP binning) is carried out. This is generally analogous to CCP binning for a P-s event. Other processing operations, such as deconvolution and correction for receiver statics may also be applied.

Figure 5:
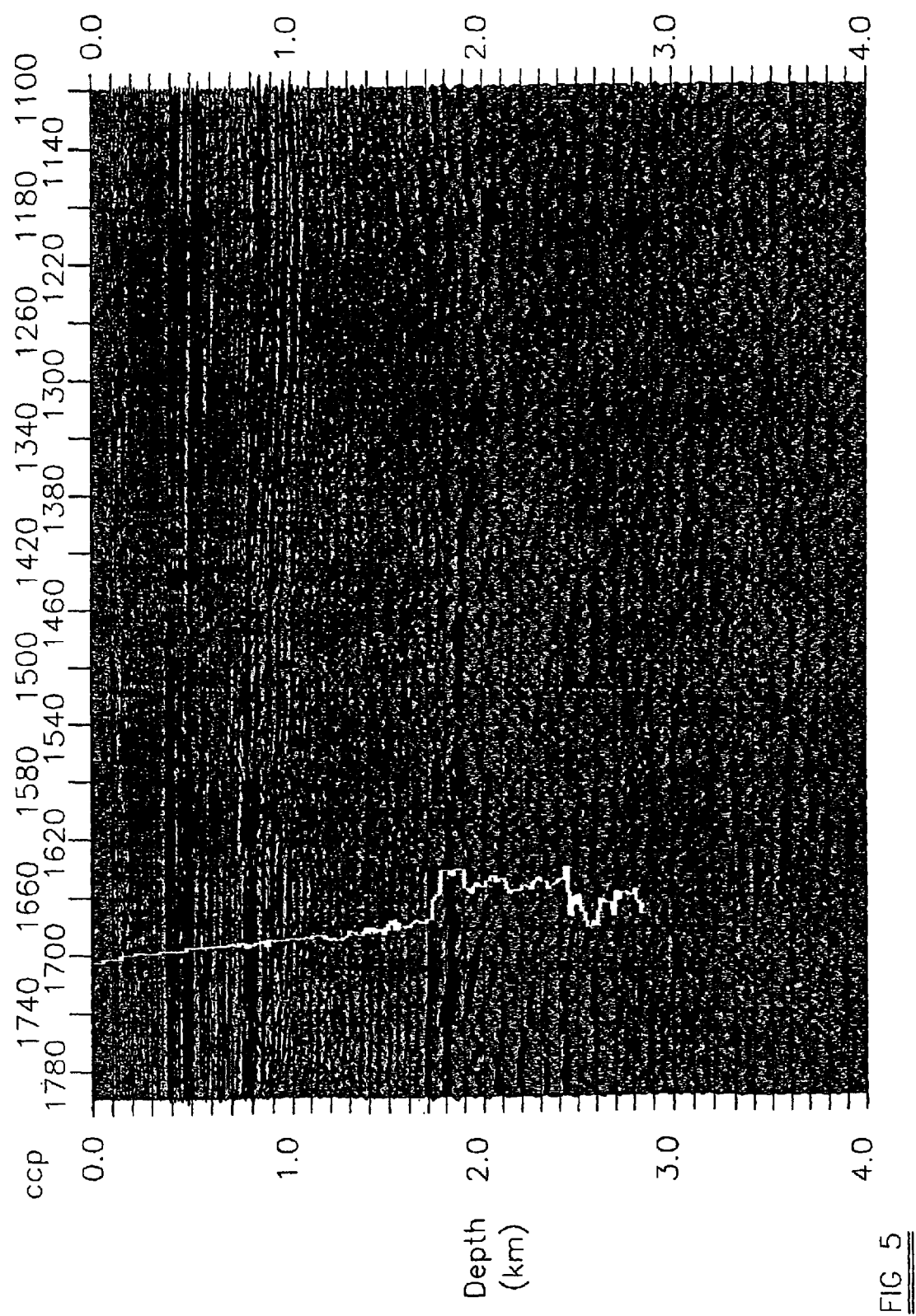
FIG. 5 shows the results of processing seismic data using a velocity-depth model according to the present invention.

FIG. 5 shows the result obtained from a velocity model of the present invention. The horizontal scale represents the common conversion point, and the vertical scale represents depth in km. P-s mode events caused by reflections at the upper surface of a high velocity chalk layer are prominent at around 1.7 km depth, but events caused by reflection at the base of the chalk layer, or by reflection below the chalk layer, are clearly visible. The section below the chalk layer shows better vertical resolution than the section above the chalk layer. This Figure clearly shows that the present invention allows high-quality imaging below a high velocity layer.

FIG. 4 also shows (as the white trace) the relative shear impedance log at the location of the borehole.

The embodiments described above relate to a calibrating a velocity model using a one-dimensional VTI velocity model. This model is strictly valid only at locations near the borehole. There are a number of ways in which the model could be extended to distances further away from the borehole. In one approach, the VTI velocity-depth model could be averaged for effective time-based parameters to seed parameter scans away from well locations, using the method proposed by I. Tsvankin et al in "Geophysics" Vol 59 (1994) pp 1290–1304, or using the method proposed by T. Cheret et al in a paper submitted to the 70th Annual International Meeting of Society of Exploration Geophysicists.

Alternatively, if additional well data are available in the volume of the earth covered by the surface seismic data, the method described above can be repeated at additional control points, and a locally one-dimensional model can be interposed between the control points.

A further approach to extending the model would be to use the one-dimensional model to constrain a 3-dimensional anisotropic prestack depth migration process.

The embodiment of the invention described above relates to the use of VSP data in the processing of surface seismic data, for example OBC seismic data, that contains mode conversion events. The invention is not limited to this specific application, however, but may be applied to all surface seismic data or towed marine seismic data. The invention may be applied to multi-component seismic data or to single component seismic data.

A further application of the invention is to the long-offset processing of surface seismic data. Processing of long-offset seismic data requires accurate knowledge of the anisotropy parameters, of the effective value of the anelasticity parameter Q, and of the AVO response. This information may be obtained in a multi-offset VSP seismic survey using a three-component seismic receiver located within a borehole, and used to adjust an initial velocity mode to improve its accuracy. The data may then be processed using the improved velocity model.

A further application of the invention is to pre-stack depth migration of seismic data. Accurate migration requires an accurate velocity model, which conventional techniques are not always able to provide. Once an initial velocity model has been obtained, the method of the invention may be used to improve the accuracy of this velocity model, by constraining the velocity model so that it reproduces travel times obtained from VSP data. This improves the accuracy of the velocity model, particularly in the vicinity of the borehole used to obtain the VSP data. Once the velocity model has been corrected in this way, it can be further corrected by, for example, including anisotropy in the model [does the anisotropy information also come from VSP data?]. This method is particularly effective if 3D VSP data is used to constrain the initial velocity model.

What is claimed is:

1. A method of processing seismic data, comprising:

using vertical seismic profile (VSP) seismic data to determine a velocity model of seismic energy for one or more P-waves;

calibrating the velocity model of seismic energy for the P-waves; and using the velocity model of seismic energy for the P-waves to process the seismic data.

2. The method of claim 1, wherein using the VSP seismic data to determine the velocity model comprises extending the VSP seismic data from a dipole sonic log through an overburden.

3. The method of claim 2, wherein the VSP seismic data is extended using at least one of a compaction trend velocity, a regional check shot information, or a surface seismic Dix velocity.

4. A method of processing seismic data, comprising:

using vertical seismic profile (VSP) seismic data to determine a velocity model of seismic energy for one or more P-waves;

calibrating the velocity model of seismic energy for the P-waves using the VSP seismic; and using the velocity model of seismic energy for the P-waves to process the seismic data.

5. The method of claim 4, further comprising using the VSP seismic data to determine a velocity model of seismic energy for one or more S-waves.

6. The method of claim 1, further comprising using the VSP seismic data to determine a velocity model of seismic energy for one or more S-waves.

7. The method of claim 5, further comprising calibrating the velocity model of seismic energy for the S-waves using the VSP seismic data.

8. The method of claim 6, further comprising calibrating the velocity model of seismic energy for the S-waves using the VSP seismic data.

9. The method of claim 7, further comprising calibrating the velocity model of seismic energy for at least one of the S-waves or the P-waves using one of surface seismic data or towed marine seismic data.

10. The method of claim 8, wherein the velocity model of seismic energy for at least one of the S-waves or the P-waves is calibrated using one of surface seismic data or towed marine seismic data.

11. The method of claim 1, wherein the velocity model is an anisotropic velocity model.

12. The method of claim 6, wherein the velocity model is an anisotropic velocity model.

13. The method of claim 5, further comprising calibrating the velocity model of seismic energy for at least one of the S-waves or the P-waves to take into account anelastic attenuation of seismic energy.

14. The method of claim 1, wherein the velocity model is a VTI velocity model.

15. The method of claim 6, wherein the velocity model is a VTI velocity model.

16. The method of claim 1, wherein the velocity model is a one dimensional velocity model.

17. The method of claim 6, wherein the velocity model is a one dimensional velocity model.

18. The method of claim 1, wherein the seismic data is a multi-component seismic data.

19. A method for processing seismic data, comprising:

using vertical seismic profile (VSP) seismic data to determine a velocity model of seismic energy for one or more P-waves and a velocity model of seismic energy for one or more S-waves;

calibrating the velocity model of seismic energy for at least one of the P-waves and the S-waves using the VSP seismic data; and using the model of the velocity of seismic energy to process the seismic data.

20. The method of claim 19, further calibrating the velocity model of seismic energy for at least one of the P-waves and the S-waves using surface seismic data.

21. The method of claim 19, further calibrating the velocity model of seismic energy for at least one of the P-waves and the S-waves using towed marine seismic data.

* * * * *